Oct. 24, 1933.  R. F. KRAUSE  1,932,221

COFFEE CONTAINER

Filed Nov. 5, 1931

INVENTOR

BY R. F. Krause

Frease and Bishop ATTORNEYS

Patented Oct. 24, 1933

1,932,221

UNITED STATES PATENT OFFICE 1,932,221

COFFEE CONTAINER

Richard F. Krause, Massillon, Ohio

Application November 5, 1931. Serial No. 573,067

4 Claims. (Cl. 220—46)

The invention relates to containers or canisters for home use, being especially adapted for keeping the coffee in fresh condition after it is removed from the original container or package. Certain oils which are essential to the production of coffee beverage of good quality are contained in the coffee bean. After the coffee bean is roasted and broken or crushed as by grinding, these oils are quickly extracted therefrom by contact with boiling water. It is well known, however, that after the coffee bean is broken or crushed these oils quickly become rancid due to decomposition or chemical change caused by contact with the air, thus materially reducing the value of the ground coffee as a medium of producing coffee beverage. It is therefore necessary to keep the ground coffee out of contact with the air for the purpose of retaining these oils therein in their original fresh condition.

In my prior application Serial No. 564,069 I have disclosed a substantially air-tight coffee container for maintaining the ground coffee in proper condition so that the oils therein will remain in their original fresh and sweet condition until the ground coffee is used for producing coffee beverage.

The object of the present improvement is to provide another form of coffee container for maintaining ground coffee in its original fresh condition.

A further object is to provide a ring of flexible rubber or the like between the container and the cover therefor, a flexible tube being located upon the rear side of said ring for adding to the resiliency thereof.

Figure 1:
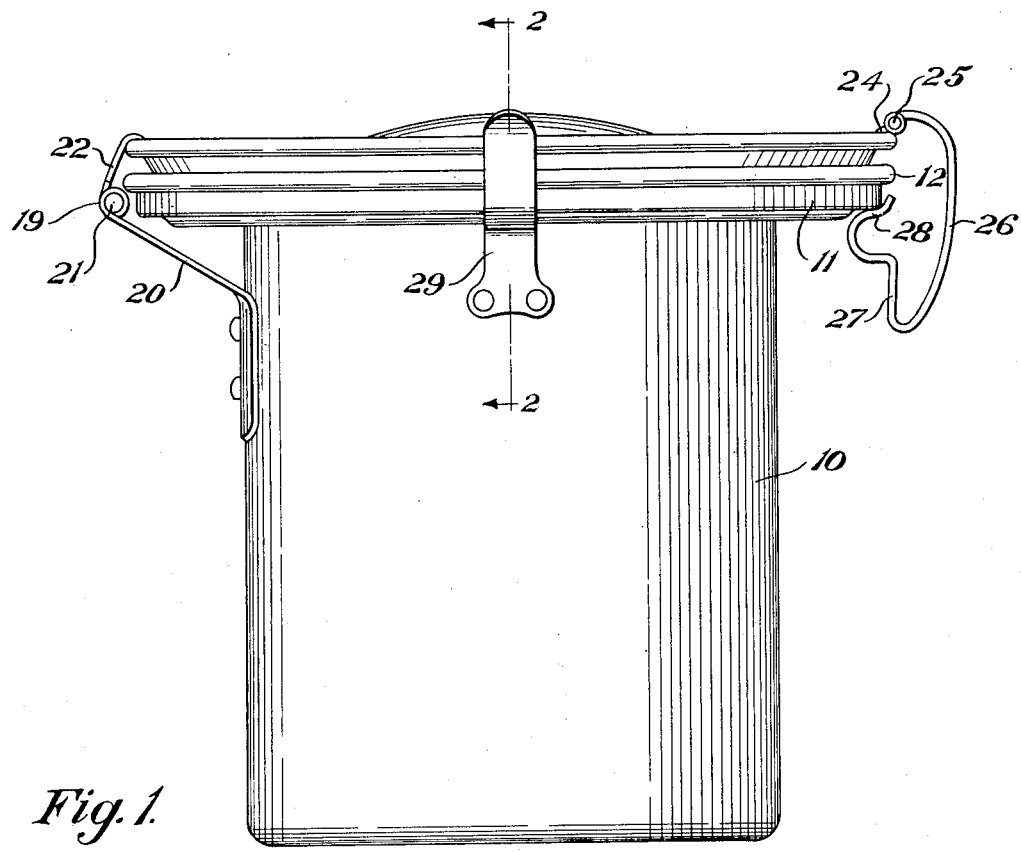
Figure 2:
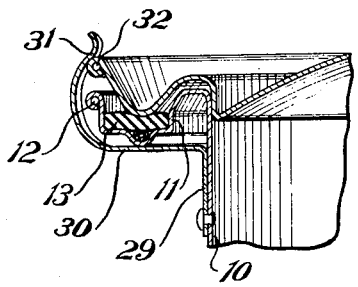
Figure 3:
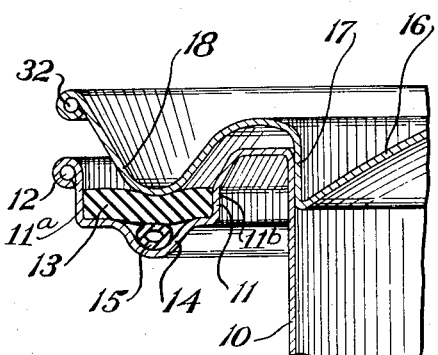

An embodiment of the invention thus set forth in general terms is illustrated in the accompanying drawing, in which Figure 1 is a side elevation of the improved coffee container;

Fig. 2, a fragmentary sectional view of the same as on the line 2—2, Fig. 1; and Fig. 3, an enlarged section through the rim portion of the cover and the channel rim of the container showing the compressible ring and flexible tube therein.

Similar numerals refer to similar parts throughout the drawing.

The container is shown generally at 10 and may be of cylindric form and of a size suitable to hold the desired amount of ground coffee ready for use. A rim channel 11 is provided at the upper open end of the container 10 and has angular upwardly extending side walls 11a and 11b, being preferably located around the periphery thereof and the side wall 11a terminating in the peripheral strengthening bead 12.

Within the channel 11 is located a compressible ring 13, of rubber or other suitable resilient material. The ring 13 is preferably maintained in position by engagement with the angular side walls 11a and 11b of the rim channel. For the purpose of imparting sufficient flexibility to the action of the ring 13 to permit the same to be compressed, as will be later described, the rim channel 11 may be provided with the substantially central groove or recess 14.

In order to confer additional resilience to the compressible ring 13, particularly where the same has lost some of its resilience due to age, a flexible tubular ring 15 may be located in the groove or recess 14 substantially in contact with the compressible ring 13 and adapted to be compressed by said ring when the same is under compression, as best shown in Fig. 3. When pressure is removed from the ring 13 it will be seen that the tubular ring 15 will spring back to its normal shape and will thereby assist in bringing the ring 13 back to its normal position.

It should be understood that while this resilient tubular ring is illustrated in the accompanying drawing as located within the rim flange of the container per se, the use of the same is not limited to this specific disclosure as the tubular ring is equally well adapted for use in the rim flange of the cover of my prior application Serial No. 564,069 above referred to.

The cover, shown generally at 16, may be provided with the annular flange 17 adapted to have a sliding fit within the upper open end of the container 10 and is provided with the rolled rib 18 adapted to extend into the rim channel 11 of the container and to contact with the compressible ring 13, compressing and distorting the same as best shown in Fig. 3, in order to provide an air-tight joint between the container and cover.

If desired, the cover may be attached to one side of the container as by the hinge 19 comprising the angular leaf 20 connected to the side wall of the container and hingedly connected as by the hinge pin 21 to the leaf 22 carried by the cover, said hinge leaves being preferably notched or stepped in any suitable manner to support the cover in open position.

For the purpose of tightly clamping the cover upon the container, in order to compress the ring 13 between the rolled rib 18 and the rim channel 11, to form an air-tight joint between the container and cover, a clamp may be provided diametrically opposite to the hinge. This clamp, as shown in Fig. 1, may comprise the bracket portion 24 carried by the cover and having hingedly connected thereto, as at 25, a depending clamping member 26 provided with the upturned end 27 terminating in the curved spring portion 28 for engagement under the rim channel 11 of the container.

If desired, other clamping means may be provided for assisting in tightly holding the cover upon the container, this being in the form of spring clips 29 connected to the container at spaced points between the hinge and clamp, each of these spring clips preferably having an offset portion 30 extending beyond the rim channel 11 of the container and terminating in an upturned curved spring portion 31 for engagement over the peripheral bead 32 surrounding the rolled rib 18 of the cover.

From the above it is obvious that a container or canister is provided wherein the coffee may be sealed substantially air tight so as to retain the same in its original fresh condition, preventing decomposition or chemical change in the essential oils of the coffee.

I claim:

1. A container having a rim channel at its upper, open end, a compressible ring located in said channel, said rim channel having a groove below said compressible ring, a resilient tube within said groove adapted to be compressed by the ring, a cover for the container provided with a rib for contact with said compressible ring, and means for clamping the cover upon the container to compress the ring.

2. A container and a cover therefor, a rim channel upon one of said members, a compressible ring in said rim channel, said rim channel having a groove therein, a resilient tube within said groove, a rib upon the other member, and means for clamping the cover upon the container to compress said ring and tube.

3. A container and a cover therefor, a rim channel upon one of the members, a compressible ring in said rim channel, said rim channel having a groove in the central portion thereof, a resilient tube within said groove, a rib upon the other member adapted for engaging the central portion of said compressible ring, and means for clamping the cover upon the container to compress said ring and tube.

4. A container and a cover therefor, a rim channel upon one of the members, a compressible ring in said rim channel, a resilient tube within said rim channel and engaging one side of the compressible ring, a rib upon the other member adapted for engaging the other side of the compressible ring, and means for clamping the cover upon the container to compress said ring and tube.

RICHARD F. KRAUSE.